United States Patent [19]
Starita et al.

[11] Patent Number: 5,474,312
[45] Date of Patent: Dec. 12, 1995

[54] CART FOR EQUESTRIAN EQUIPMENT AND SUPPLIES

[76] Inventors: Michael S. Starita, 16 Deerfield Ct., Basking Ridge, N.J. 07920; Joseph M. Starita, 13 Beverly Dr., Belle Mead, N.J. 08502

[21] Appl. No.: 127,423
[22] Filed: Sep. 27, 1993
[51] Int. Cl.⁶ .................................................. B62B 3/02
[52] U.S. Cl. .................................. 280/47.19; 280/47.28; 280/47.29; 280/47.35
[58] Field of Search .............................. 280/47.2, 47.19, 280/47.35, 47.28, 47.29, 79.5

[56] References Cited

U.S. PATENT DOCUMENTS

| 305,007 | 9/1884 | Jones . | |
|---|---|---|---|
| 343,890 | 6/1886 | Conn . | |
| 1,320,706 | 11/1919 | Pauly | 280/47.35 |
| 1,428,248 | 9/1922 | Morrow | 280/47.2 |
| 2,243,312 | 2/1940 | Fiala | 280/47.19 |
| 2,560,059 | 7/1951 | Young . | |
| 2,582,435 | 1/1952 | Howard | 280/47.35 |
| 2,673,671 | 3/1954 | Williams . | |
| 2,831,698 | 4/1958 | Mills . | |
| 3,258,275 | 6/1966 | Schaefer et al. . | |
| 3,363,787 | 1/1968 | Macomber | 280/47.29 |
| 3,460,850 | 8/1969 | Franklin . | |
| 3,741,574 | 6/1973 | Burrow, Jr. . | |
| 3,874,531 | 4/1975 | Mayo . | |
| 3,997,181 | 12/1976 | Jaco et al. | 280/47.19 |
| 4,448,434 | 5/1984 | Anderson | 280/47.29 |
| 4,493,492 | 1/1985 | Balabanova . | |
| 4,526,399 | 7/1985 | Holtz | 280/47.29 |
| 5,160,153 | 11/1992 | Zan . | |
| 5,160,154 | 11/1992 | Seydel et al. | 280/47.19 |
| 5,362,078 | 11/1994 | Paton | 280/47.28 |

FOREIGN PATENT DOCUMENTS

| 2584358 | 1/1987 | France | 280/47.29 |
|---|---|---|---|
| 2432267 | 1/1976 | Germany | 280/47.35 |
| 344945 | 3/1931 | United Kingdom | 280/79.5 |
| 752398 | 7/1956 | United Kingdom | 280/47.2 |

Primary Examiner—Margaret A. Focarino
Assistant Examiner—Min S. Yu
Attorney, Agent, or Firm—Samuelson & Jacob

[57] ABSTRACT

A cart provides facilities for handling and transporting a wide variety of equestrian equipment and supplies, including a saddle, tack containers, bales, packages and buckets, and includes a wheeled frame, a foot pivoted on the frame for retraction to a compact configuration and extension to support some of the items, a rack pivoted on the frame for retraction to a compact configuration and extension to support others of the items, and a shelf pivoted on the frame below the rack for retraction to a compact configuration and extension to support still others of the items.

12 Claims, 7 Drawing Sheets

CART FOR EQUESTRIAN EQUIPMENT AND SUPPLIES

The present invention relates generally to hand carts and pertains, more specifically, to a cart for assisting in the handling and transport of equestrian equipment and supplies.

Over the past several years, the number of equestrian enthusiasts has been increasing, leading to a concomitant increase in the number of enthusiasts attending and participating in horse shows and other equestrian events. Participation in such events requires not only the transport of a horse to the site of the event, but the handling and transport of a number of items of equestrian equipment and supplies, such as saddles, tack boxes and trunks, bales of hay and bedding packages, feed and water buckets, and muck buckets. It becomes necessary for the participants to load, unload and carry each of these items to and from a transportation truck or trailer brought to the site of the event, as well as to handle some items during the course of the event itself.

While hand carts of various configurations have been available for the handling and transport of many different items, the present invention provides a single cart which is made readily available to facilitate the handling of essentially all of the equestrian items of equipment and supplies needed by participants at horse shows and other equestrian events. As such, the present invention attains several objects and advantages, some of which are summarized as follows: Provides a compact, easily stored and transported hand cart which is readily available for the handling of equestrian items of equipment and supplies; eases the burden of carrying equestrian items between a transportation truck or trailer and a horse stall or another accommodation at a horse show or another equestrian event, as well as the handling of items during the course of the event; is itself stored or transported in a compact configuration and then is readily erected for use in connection with a horse show and the like; provides exceptional stability and ease of maneuvering, even over any rough terrain encountered during the transport of equestrian items to and from a transportation truck or trailer, or during the course of an event; is converted readily to any one of several operational configurations for the handling of a wide variety of equestrian equipment and supplies found by equestrian enthusiasts to be necessary adjuncts to participation in equestrian events; has a rugged construction for exemplary performance over an extended service life.

The above objects and advantages, as well as further objects and advantages, are attained by the present invention which may be described briefly as an equestrian item cart providing facilities for handling and transporting a wide variety of equestrian equipment and supplies, including a saddle, tack containers, bales, packages and buckets, the cart comprising: a frame having a front end, a longitudinally opposite rear end, and laterally opposite sides; first wheels journaled for rotation on the frame about at least a first lateral axis located adjacent the front end of the frame, the first wheels having a first diameter and being spaced apart laterally a first lateral distance; second wheels journaled for rotation on the frame about at least a second lateral axis located between the first lateral axis and the rear end of the frame, the second wheels having a second diameter and being spaced apart laterally a second lateral distance; the second diameter being substantially greater then the first diameter, and the relative location of the first and second lateral axes being such that the frame is inclined upwardly from the front end toward the rear end of the frame at an acute angle to the horizontal; a rack mounted upon the frame for pivotal movement about a third lateral axis located between the first lateral axis and the rear end of the frame, between a retracted position wherein the rack is juxtaposed with the frame, and an extended position wherein the rack is oriented generally horizontally in a first altitudinal location; and first prop means for selectively supporting the rack in the extended position for supporting at least some of the equestrian items on the rack.

The invention will be understood more fully, while still further objects and advantages will become apparent, in the following detailed description of a preferred embodiment of the invention illustrated in the accompanying drawing, in which:

Referring now to the drawing, and especially to FIGS. 1 through 4 thereof, a cart constructed in accordance with the present invention is illustrated generally at 10 and is seen to include a frame 12 extending longitudinally between a front or lower end 14 and a rear or upper end 16. A pair of smaller diameter wheels 20 are mounted for rotation on the frame 12 adjacent the lower end 14. Wheels 20 are journaled upon opposite ends of an axle 22 carried by the frame 12 so that the wheels 20 rotate about a common lateral axis defined by the axle 22. A pair of larger diameter wheels 24 are mounted for rotation on the frame 12 between the axle 22 and the upper end 16 of the frame 12. Wheels 24 are considerably larger in diameter than wheels 20 and are journaled on stub shafts 26 carried by struts 28 depending from frame 12. The arrangement places the frame 12 in an inclined attitude, with the upper end 16 elevated altitudinally above the lower end 14 and the frame 12 making an acute angle A (see FIG. 5) with the horizontal. Wheels 24 are retained upon stub shafts 26 by selectively removable retaining pins 29 so that the wheels 24 may be dismounted readily for compact storage or transportation of the cart 10.

In order to conserve weight, while providing strength and rigidity, frame 12 is constructed of several structural members integrated into a single assembly. Thus, frame 12 includes longitudinally extending side members 30 spaced apart laterally. Lateral cross members 32 are welded or otherwise joined to side members 30. A looped portion 34 is unitary with the side members 30 at the upper end 16 of the frame 12 and serves as part of a handle 36 for maneuvering the cart 10 during use. A further looped portion 38 is integral with the frame 12 at the upper end 16 and provides an additional part of handle 36. In this manner, handle 36 may be gripped along either or both of the looped portions 34 and 38 for maximum effectiveness in maneuvering the cart 10 through either pushing or pulling motions. The use of relatively large diameter wheels 24 facilitates movement of the cart 10, especially over rough terrain which can be encountered during the transport and handling of equestrian items either in preparation for or during the course of an equestrian event. In addition, the lateral spacing between wheels 24 is greater than the lateral spacing between wheels 20 to enhance stability of the cart 10. In the illustrated preferred embodiment, frame 12 has a longitudinal length between ends 14 and 16 of about fifty-six inches, wheels 20 have a diameter of about six inches and wheels 24 have a diameter of about twenty inches, with angle A being about forty-five degrees. The lateral spacing between wheels 24 is about twenty-four inches, while the lateral spacing between wheels 20 is about sixteen inches. The arrangement assures that the center of gravity of the loads carried by cart 10 is placed longitudinally between the wheels 20 and 24.

Figure 1:
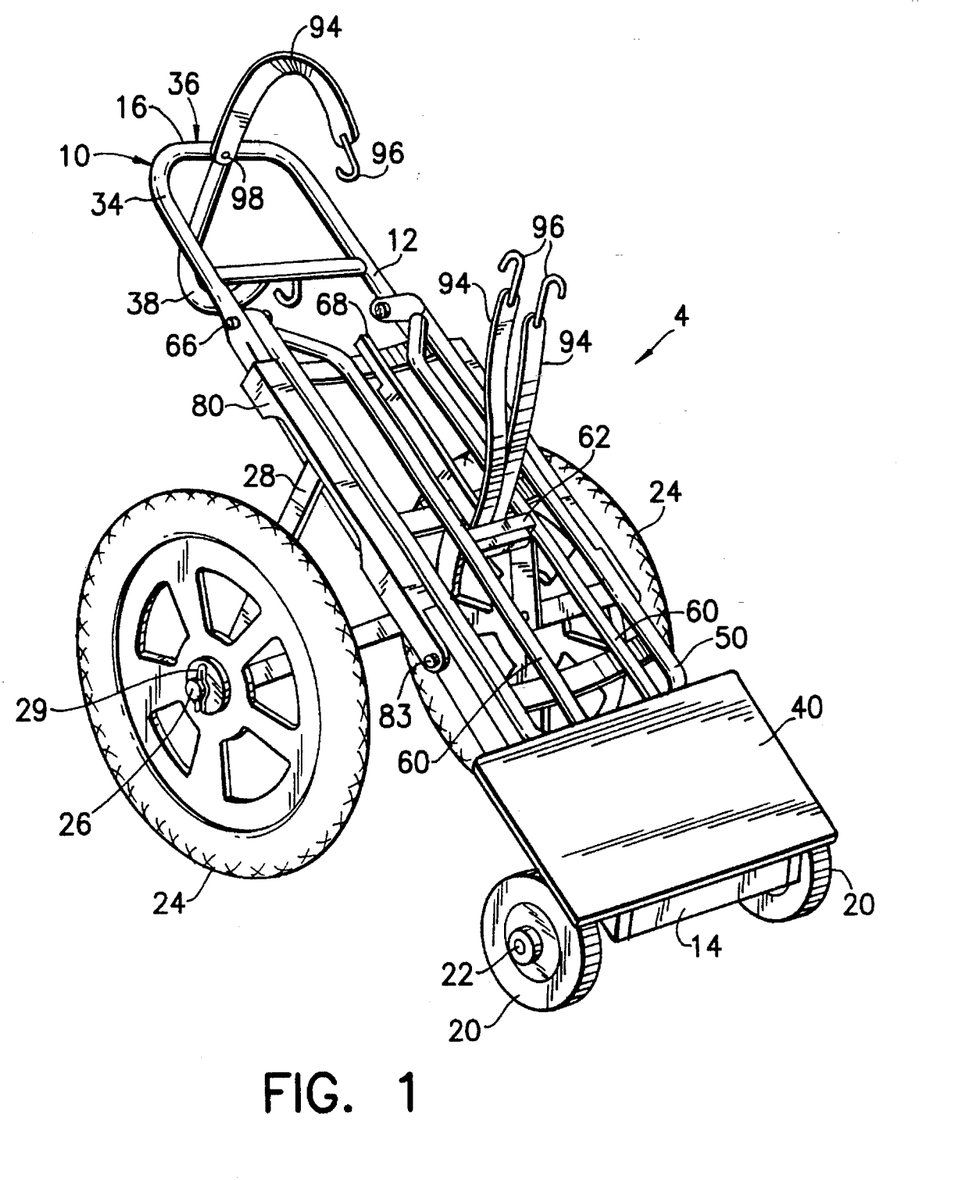
FIG. 1 is a front perspective view of a cart constructed in accordance with the present invention.
Figure 5:
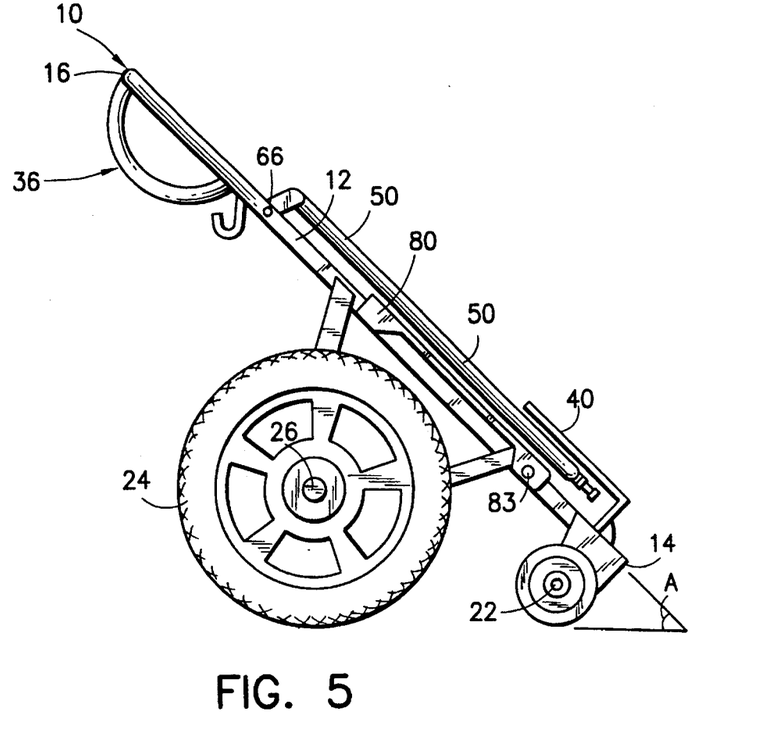
FIGS. 5 through 10 are diagrammatic side elevational views illustrating various uses of the cart.
Figure 8:
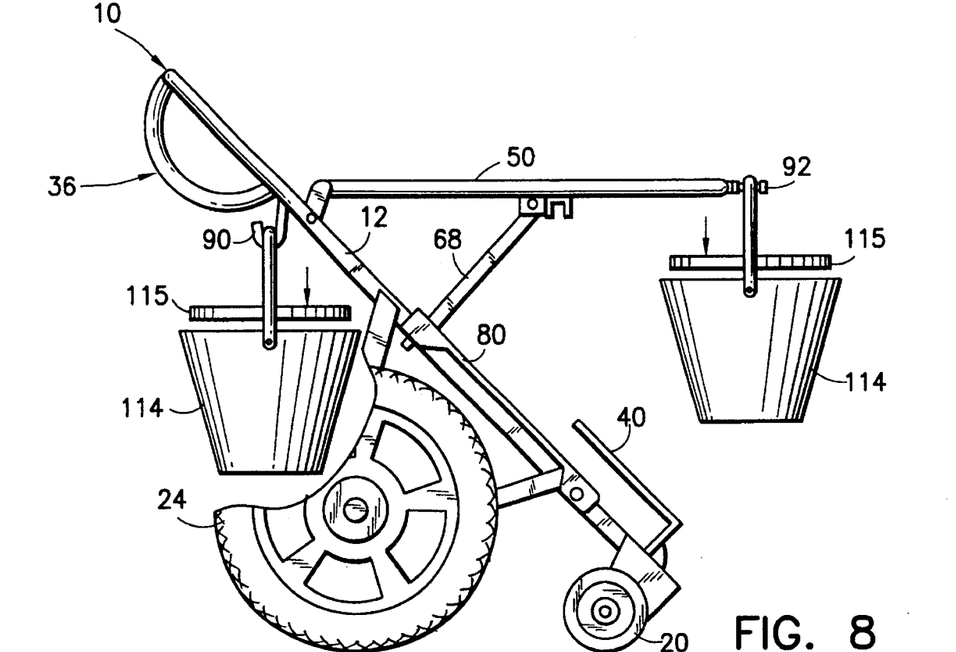

A foot, shown in the form of a plate 40, is mounted at the lower end 14 of the frame 12 for pivotal movement about a lateral axis located adjacent the lower end 14, the pivotal movement being between an extended position, wherein the plate 40 extends in a direction generally normal to the frame 12, as seen in FIGS. 2, 4, 6, 7, 9 and 10, and a retracted position, wherein the plate 40 is juxtaposed and generally coextensive with the frame 12, as seen in FIGS. 1, 5 and 8. To this end, plate 40 carries ears 42 which are pivotally mounted upon frame 12 by pivot pins 44. When the plate 40 is retracted, the cart 10 has a more compact configuration for storage or for transportation. As will be explained below, both the extended position and the retracted position of the plate 40 serve specific functions during use of the cart 10.

Figure 2:
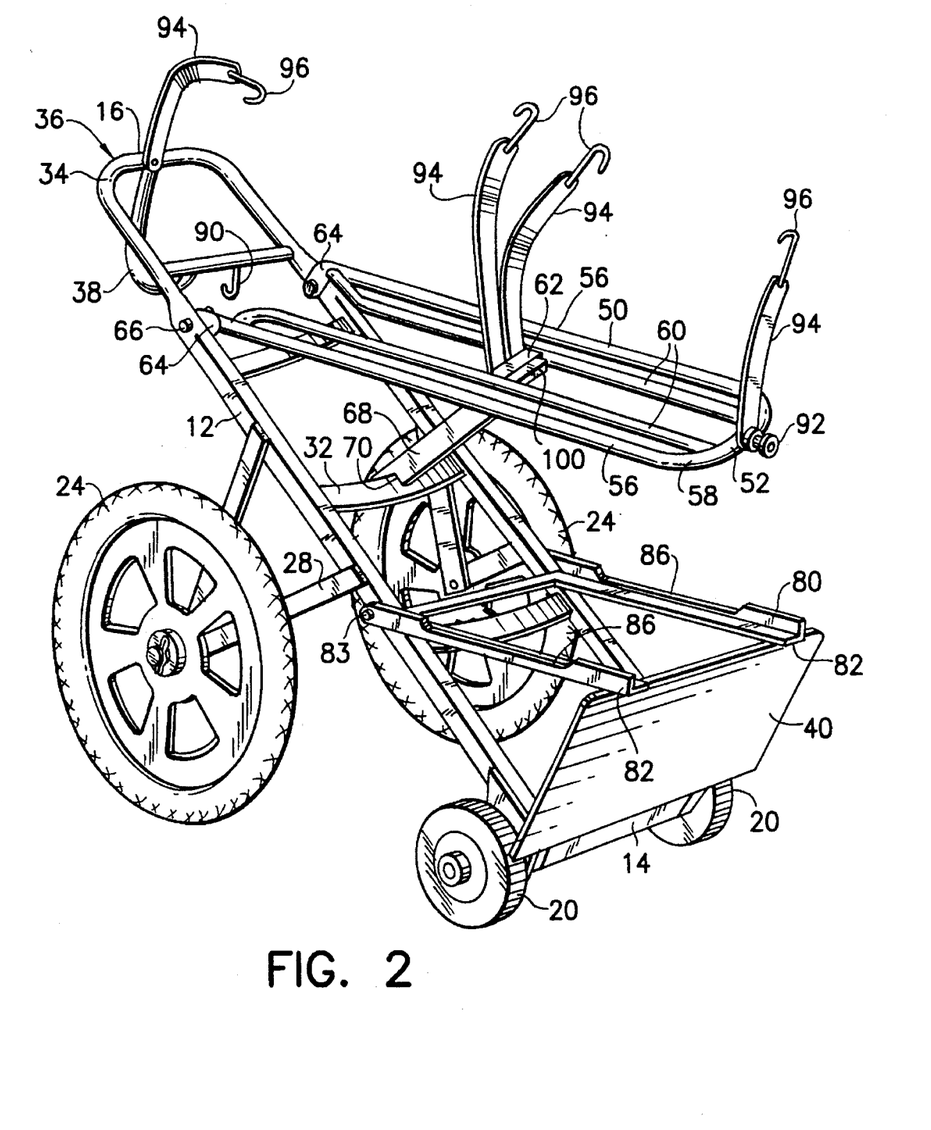
FIG. 2 is a front perspective view of the cart, with component parts in another operating position.
Figure 3:
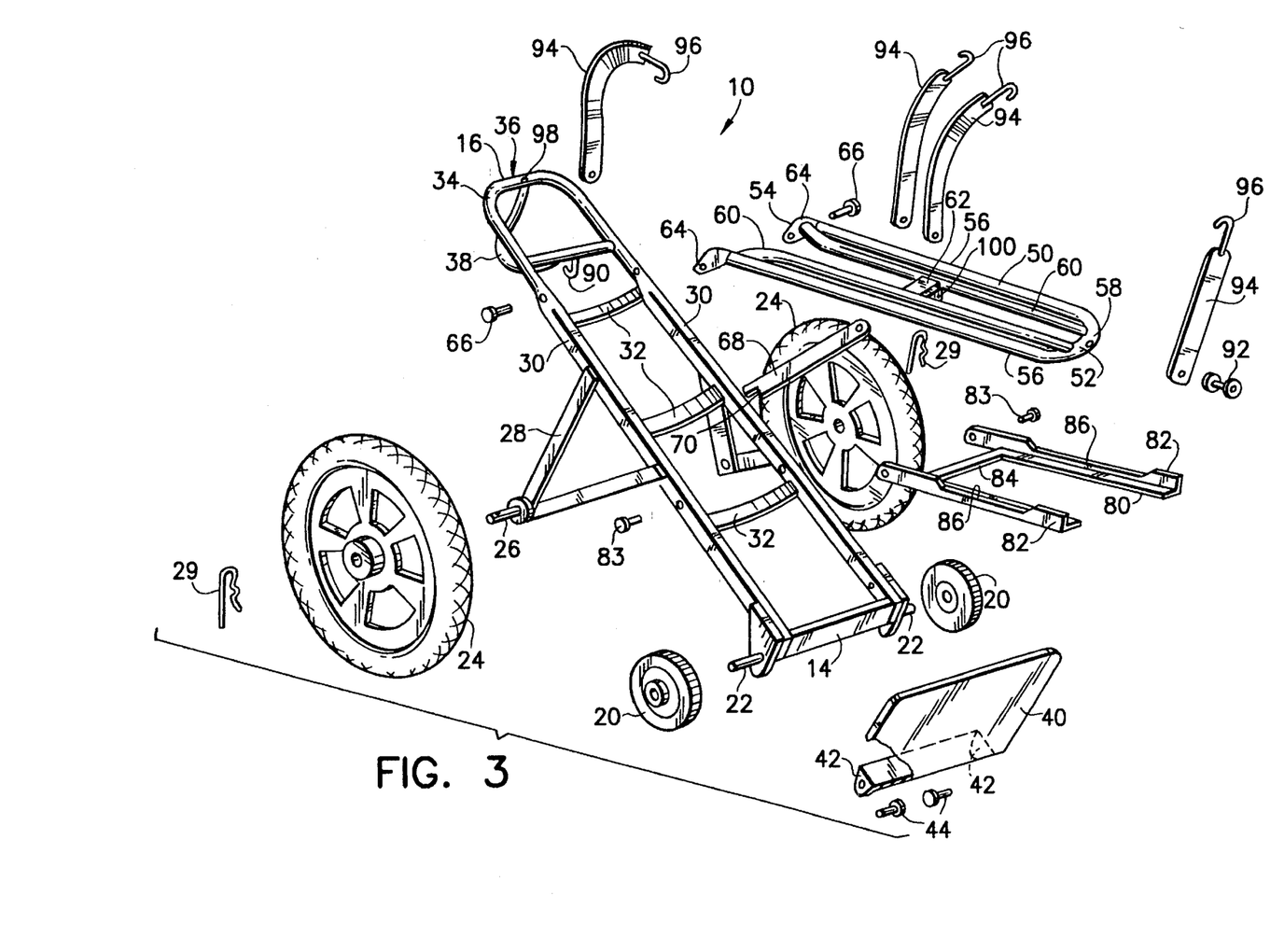
FIG. 3 is a front perspective exploded view of the cart.
Figure 4:
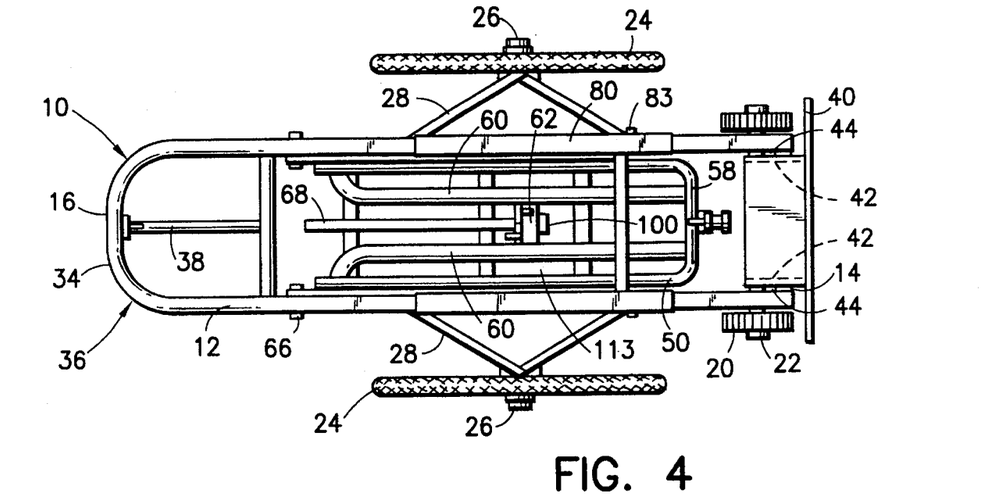
FIG. 4 is a plan view of the cart taken in the direction of the arrow in FIG. 1, but with the foot of the cart extended.

A rack 50 is mounted on frame 12 for pivotal movement about another lateral axis located between the axle 22 and the upper end 16 of the frame 12, the pivotal movement being between a retracted position, as seen in FIGS. 1, 4, 5, 6 and 7, and an extended position, illustrated in FIGS. 2, 8, 9 and 10. Rack 50 extends in a longitudinal direction between a forward end 52 and a rearward end 54 and includes longitudinal side members 56 and a forward end member 58. A pair of longitudinal runners 60 extend between the forward end 52 and the rearward end 54 and carry a cross block 62 intermediate the forward and rearward ends 52 and 54. Arms 64 are integral with the rack 50 at the rearward end 54 and corresponding bolts 66 pass through arms 64 to mount the rack 50 on the frame 12 for pivotal movement about a lateral axis defined by the bolts 66, the pivotal movement being between the retracted and extended positions. In the retracted position, the rack 50 is juxtaposed with the frame 12 and is generally coextensive with the frame 12. In the extended position, rack 50 is oriented in a generally horizontal attitude at an upper altitudinal location. Prop means in the form of a bar 68 supports the rack 50 in the extended position. One end of bar 68 is pivotally mounted to cross block 62 while the other end of bar 68 includes a shoulder 70 which engages a lateral cross member 32 of frame 12, as seen in FIG. 2, when the rack 50 is in the extended position, to support the rack 50 in the extended position. Thus, when the rack 50 is in the retracted position, bar 68 is folded into juxtaposition with the rack 50 and lies between the rack 50 and the frame 12. Upon lifting of the rack 50 to the extended position, bar 68 swings about the pivotally mounted end of the bar 68 so as to depend from the rack 50 and bring the shoulder 70 into engagement with the cross member 32 for support of the rack 50 in the extended position. Retraction of the rack 50 is accomplished merely by disengaging the shoulder 70 of bar 68 from the cross member 32 to permit pivotal movement of the rack 50 back to the retracted position.

Figure 9:
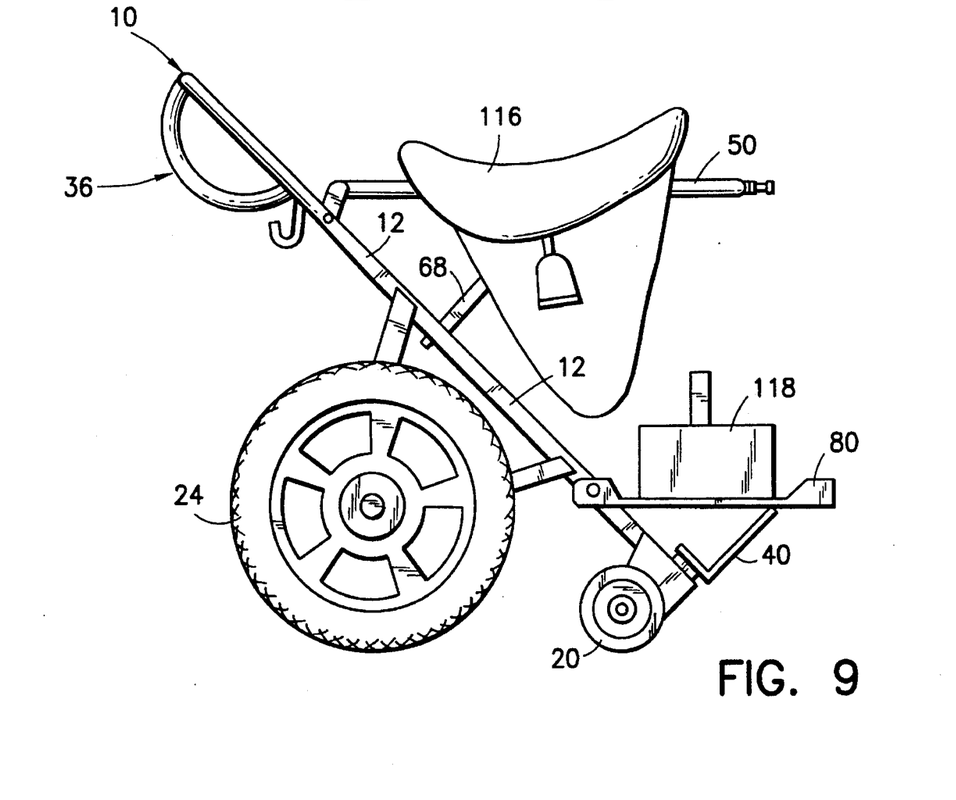
Figure 10:
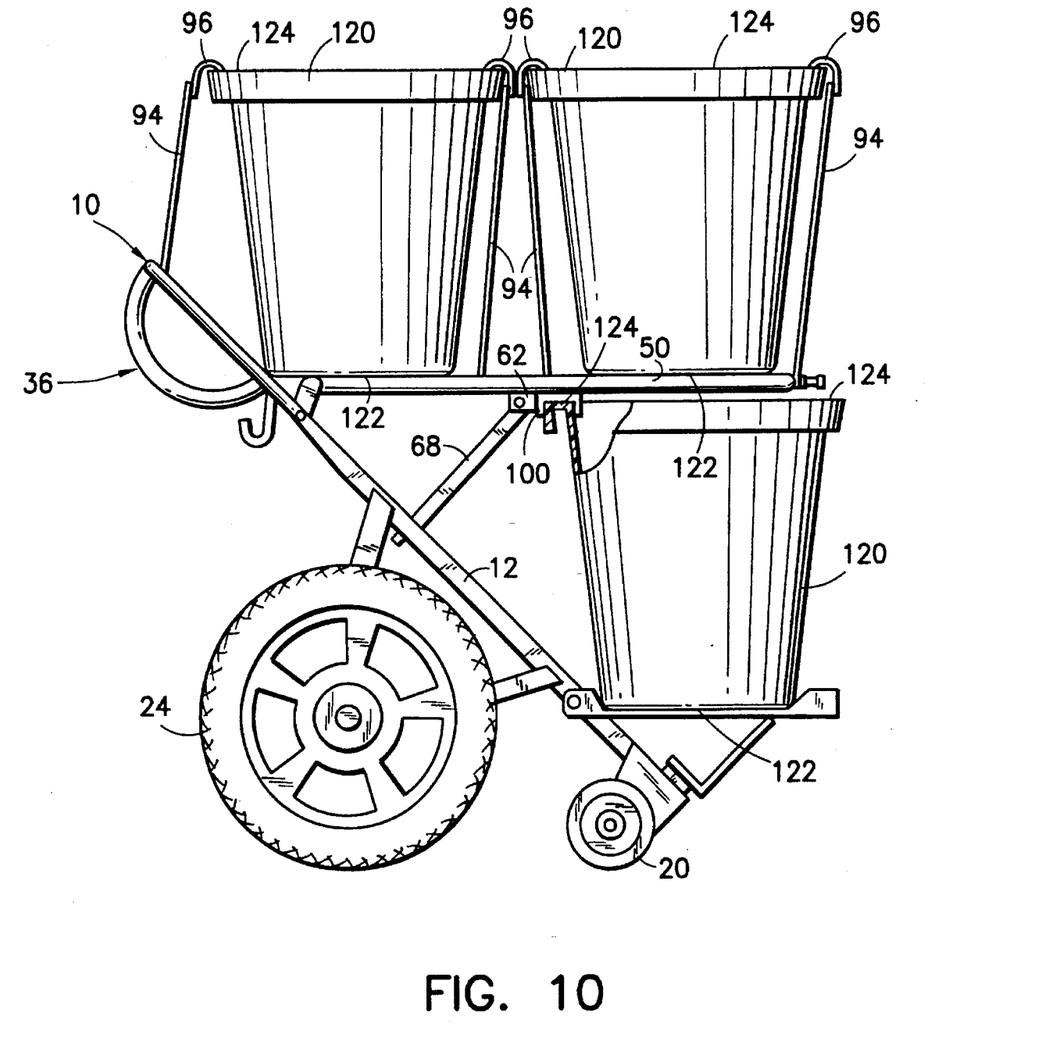

A lower shelf 80 is mounted on the frame 12 for pivotal movement about a further lateral axis located between the lower end 14 of the frame 12 and the pivotal axis defined by bolts 66, the pivotal movement being between a retracted position, wherein the shelf 80 is juxtaposed with the frame 12 and extends in a direction generally coextensive with the frame 12, as seen in FIGS. 1, 4, 5, 6, 7 and 8, and an extended position, wherein the shelf 80 extends in a generally horizontal orientation, in a lower altitudinal location below the rack 50, as seen in FIGS. 2, 9 and 10. Shelf 80 is seen to include a pair of side members 82 extending longitudinally and spaced apart laterally a distance sufficient to essentially straddle the frame 12 when the shelf 12 is in the retracted position. The side members 82 each are pivoted at one end to the frame 12, by means of pivot pins 83 located along a lateral axis placed between the loser end 14 of the frame 12 and the pivotal axis defined by bolts 66. A cross member 84 is integral with the side members 82 adjacent the opposite ends of the shelf 80. Each side member 82 includes an upwardly-facing elongate recess 86. In the illustrated embodiment, the plate 40 serves as prop means for supporting the shelf 80 in the extended position, as seen in FIGS. 2, 9 and 10. Thus, upon retraction of the shelf 80, the shelf 80 is juxtaposed in compact arrangement with the frame 12. When shelf 80 is to be extended for use, plate 40 is pivoted to the extended position and then shelf 80 is swung to the extended position, and is supported in that position by resting upon extended plate 40.

For purposes which will be set forth in detail below, a suspension hook 90 is integral with the frame 12 adjacent the upper end 16 of the frame 12, and a further suspension hook 92 is integral with the rack 50 at the forward end 52 of the rack 50. Elastic straps 94 are affixed to the cart 10 at one end of each strap 94 and each elastic strap 94 carries a securing hook 96 at the other end of the strap 94. Thus, an elastic strap 94 is affixed to the frame 12 at 98, two elastic straps 94 are affixed to the cross block 62 of the rack 60, and one elastic strap 94 is affixed to the rack 50 at the forward end 52 of the rack 50. The cross block 62 includes a clamp jaw 100 facing downwardly to confront the shelf 80 when the rack 50 and the shelf 80 are in the respective extended positions.

Turning now to FIGS. 5 through 10, cart 10 is depicted in FIG. 5 in a compact configuration most suited to storage or transportation of the cart 10 in a compact form. The plate 40, rack 50 and shelf 80 are in the retracted positions, juxtaposed with the frame 12 in a folded, compact configuration. In addition, wheels 24 may be dismounted, if desired, to further reduce bulk.

Figures 6, 7:
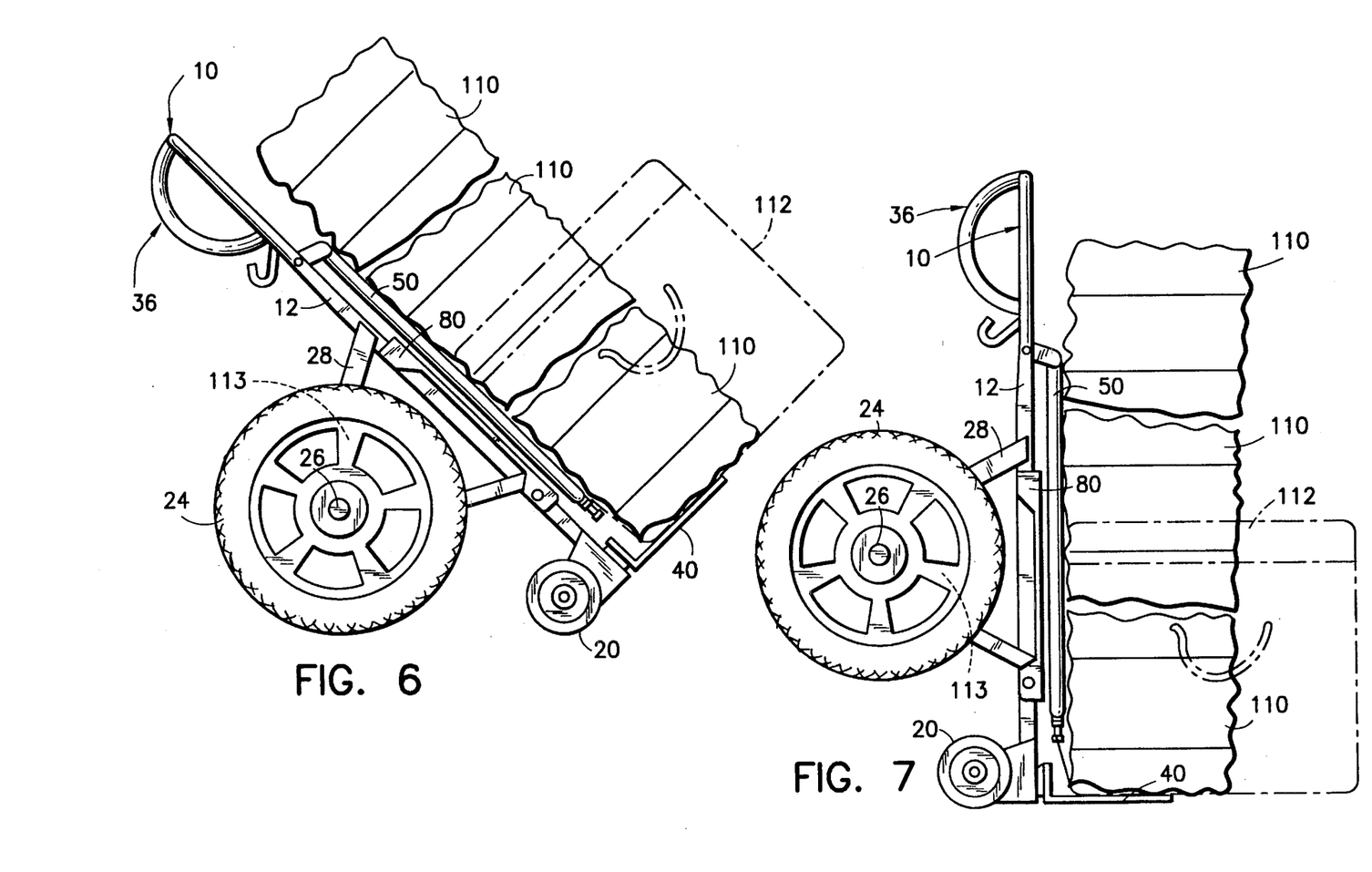

In FIG. 6, the plate 40 has been swung to the extended position and the cart 10 is Configured for carrying bales of hay and the like or packages of bedding, as depicted at 110, or a tack trunk, shown in phantom at 112. When loading such items onto cart 10, the cart is placed in a vertical orientation, as seen in FIG. 7, and the plate 40 is slipped beneath the load. Then the cart 10 is pivoted backwards to the orientation shown in FIG. 6. The use of separate stub shafts 26 carried by laterally spaced-apart struts 28, rather than a full axle which would span the distance between the struts 28, provides a clearance space 113 (also see FIG. 4) between the struts 28 beneath the frame 12, which clearance space 113 enables the user to accomplish the loading operation without interference from a full axle and without the danger of being struck by a full axle as the cart 10 is swung from the vertical orientation depicted in FIG. 7 to the transport orientation shown in FIG. 6. Moreover, movement of the cart 10 forward or backward, especially over rough terrain, is facilitated by eliminating any possible interference by a full axle to pushing or pulling stances of the user.

In FIG. 8, the rack 50 is supported by bar 68 in the extended position, in a generally horizontal orientation, and feed or water buckets are suspended from suspension hooks 90 and 92, as shown at 114. Note that plate 40 is in the retracted position so as not to interfere with the forward hanging bucket. The hooks 90 and 92 are in close enough proximity to the wheels 24 and 20, respectively, to maintain stability of the cart 10, even when only of the tow buckets 114 is present. The buckets 114 are free to swing so as to minimize any splashing or Spillage of liquids carried in the buckets 114. As an added feature, disks 115 of buoyant material are placed loosely upon the surface of the liquid in each bucket 114 so as to float freely upon the surface and inhibit the propagation of waves which otherwise could cause splashing and spillage.

In FIG. 9, the rack 50 and the shelf 80 are placed in the respective extended positions, with the rack 50 supported by bar 68 in the generally horizontal orientation and the shelf 80 supported by plate 40 in the generally horizontal orientation altitudinally below the rack 50. In this configuration, cart 10 carries a saddle, shown at 116 and a tack box, shown at 118.

In FIG. 10, cart 10 is configured as in FIG. 9, and is shown carrying three muck buckets, illustrated at 120. The bottom 122 of the lower muck bucket 120 is supported on shelf 80 and is fitted into recesses 86 while the clamp jaw 100 engages the rim 124 of the lower muck bucket 120 to maintain the muck bucket 120 stable. The bottoms 122 of the upper muck buckets 120 are supported on the rack 50, with the bottoms 122 engaged with runners 60 and the rims 124 engaged by the securing hooks 96 of respective elastic straps 94 to stabilize the upper muck buckets 120 during transport.

It will be seen that the cart 10 of the present invention is versatile and effective in meeting the requirements of participants in horse shows and other equestrian events and, as such, attains the several objects and advantages summarized above, namely: Provides a compact, easily stored and transported hand cart which is readily available for the handling of equestrian items of equipment and supplies; eases the burden of carrying equestrian items between a transportation truck or trailer and a horse stall or another accommodation at a horse show or another equestrian event, as well as the handling of items during the course of the event; is itself stored or transported in a compact configuration and then is readily erected for use in connection with a horse show and the like; provides exceptional stability and ease of maneuvering, even over any rough terrain encountered during the transport of equestrian items to and from a transportation truck or trailer, or during the course of an event; is converted readily to any one of several operational configurations for the handling of a wide variety of equestrian equipment and supplies found by equestrian enthusiasts to be necessary adjuncts to participation in equestrian events; has a rugged construction for exemplary performance over an extended service life.

It is to be understood that the above detailed description of the preferred embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. An equestrian item cart providing facilities for handling and transporting a wide variety of equestrian items in the form of equestrian equipment and supplies, including a saddle, tack containers, bales, packages and buckets, the cart comprising:

a frame having a front end, a longitudinally opposite rear end, and laterally opposite sides;

first wheels journaled for rotation on the frame about at least a first lateral axis located adjacent the front end of the frame, the first wheels having a first diameter and being spaced apart laterally a first lateral distance;

second wheels journaled for rotation on the frame about at least a second lateral axis located between the first lateral axis and the rear end of the frame, the second wheels having a second diameter and being spaced apart laterally a second lateral distance;

the second diameter being substantially greater than the first diameter, and the relative location of the first and second lateral axes being such that the frame is inclined upwardly from the front end toward the rear end of the frame at an acute angle to the horizontal and the second wheels are spaced longitudinally away from the first wheels;

a rack having laterally opposite longitudinal side members and mounted upon the frame for pivotal movement about a third lateral axis located between the first lateral axis and the rear end of the frame, between a retracted position wherein the rack is juxtaposed with the frame, and an extended position wherein the rack is oriented generally horizontally in a first altitudinal location; and first prop means pivotally connected to the rack intermediate of the longitudinal side members of the rack and engagable with a crossbar on the frame for selectively supporting the rack in the extended position for supporting a load on the rack, the load having a center of gravity and including at least some of the equestrian items, the longitudinal spacing between the first wheels and the second wheels being such that the center of gravity of the load on the rack is placed longitudinally between the first lateral axis and the second lateral axis.

2. The cart of claim 1 including:

a shelf mounted upon the frame for pivotal movement about a fourth lateral axis located between the front end of the frame and the third lateral axis, between a retracted position wherein the shelf is juxtaposed with the frame and an extended position wherein the shelf is oriented generally horizontally in a second altitudinal location below the first altitudinal location; and second prop means for selectively supporting the shelf in the extended position for supporting at least a further equestrian item on the shelf.

3. The cart of claim 2 wherein the further equestrian item includes a bucket having a bottom for resting on the shelf, and a rim elevated above the bottom, the rack including a jaw member in position altitudinally above the shelf and confronting the shelf for engaging the rim of the bucket to secure the bucket in place upon the shelf when the shelf and the rack each are in the respective extended positions.

4. The cart of claim 2 wherein the second prop means includes a foot mounted upon the frame for pivotal movement about a fifth lateral axis located adjacent the first end of the frame, between a retracted position wherein the foot extends longitudinally and is juxtaposed with the frame and an extended position wherein the foot extends essentially normal to the frame.

5. The cart of claim 1 wherein the first prop means includes a bar having a first end mounted upon the rack for pivotal movement between a retracted position wherein the bar is juxtaposed with the rack, and an extended position wherein the bar depends from the rack, and a second end opposite the first end of the bar, the second end of the bar including engagement means for engaging the frame when the rack is in the extended position of the rack to secure the bar in place to prop the rack in the extended position of the rack.

6. The cart of claim 1 including:

laterally opposite struts on the frame; and a stub shaft on each strut;

each second wheel being mounted upon a respective stub shaft such that a clearance space is provided between the struts, beneath the frame.

7. The cart of claim 1 wherein the first wheels are journaled for rotation about a common first lateral axis, the second wheels are journaled for rotation about a common second lateral axis, and the second lateral distance between the second wheels is greater than the first lateral distance between the first wheels.

8. The cart of claim 1 including a handle adjacent the second end of the frame for manually maneuvering the cart.

9. The cart of claim 1 wherein:

the frame includes side members extending longitudinally along the sides of the frame and spaced apart laterally;

the rack includes longitudinal sides spaced apart laterally relative to the lateral spacing of the side members of the frame so as to be essentially coextensive with the side members when the rack is in the retracted position.

10. The cart of claim 9 including:

a shelf mounted upon the frame for pivotal movement about a fourth lateral axis located between the front end of the frame and the third lateral axis, between a retracted position wherein the shelf is juxtaposed with the frame and an extended position wherein the shelf is oriented generally horizontally in a second altitudinal location below the first altitudinal location; and second prop means for selectively supporting the shelf in the extended position for supporting at least a further equestrian item on the shelf;

the shelf including longitudinal side elements spaced apart laterally relative to the lateral spacing of the side members of the frame so as to enable the shelf to straddle the frame when the shelf is in the retracted position.

11. The cart of claim 1 wherein:

the rack includes longitudinally opposite first and second ends;

pivot means mounts the rack upon the frame adjacent the second end of the rack;

a first suspension hook is located at the first end of the rack for selectively suspending a first bucket therefrom; and a second suspension hook is located adjacent the rear end of the frame for selectively suspending a second bucket therefrom.

12. The cart of claim 1 including resiliently extensible hold-down straps affixed to the rack for selectively securing buckets upon the rack.

* * * * *